(12) United States Patent
Kuchi

(10) Patent No.: US 11,012,263 B2
(45) Date of Patent: May 18, 2021

(54) METHOD AND APPARATUS FOR A CLUSTER SPECIFIC CLOUD RADIO TRANSMISSION AND RECEPTION

(71) Applicant: INDIAN INSTITUTE OF TECHNOLOGY HYDERABAD, Sangareddy (IN)

(72) Inventor: Kiran Kumar Kuchi, Hyderabad (IN)

(73) Assignee: INDIAN INSTITUTE OF TECHNOLOGY, HYDERABAD, Telangana (IN)

( * ) Notice: Subject to any disclaimer, the term of this patent is extended or adjusted under 35 U.S.C. 154(b) by 73 days.

(21) Appl. No.: 15/409,925

(22) Filed: Jan. 19, 2017

(65) Prior Publication Data

US 2018/0019899 A1    Jan. 18, 2018

(30) Foreign Application Priority Data

Jul. 14, 2016 (IN) .............................. 201641024178

(51) Int. Cl.
| | |
|---|---|
| H04L 25/02 | (2006.01) |
| H04L 5/00 | (2006.01) |
| H04B 7/024 | (2017.01) |
| H04B 7/022 | (2017.01) |
| H04B 7/06 | (2006.01) |
| H04W 72/04 | (2009.01) |
| H04W 88/08 | (2009.01) |

(52) U.S. Cl.
CPC ......... *H04L 25/0224* (2013.01); *H04B 7/022* (2013.01); *H04B 7/024* (2013.01); *H04B 7/0626* (2013.01); *H04L 5/005* (2013.01); *H04L 5/006* (2013.01); *H04L 5/0026* (2013.01); *H04L 5/0032* (2013.01); *H04L 5/0048* (2013.01); *H04W 72/0426* (2013.01); *H04W 88/085* (2013.01)

(58) Field of Classification Search
CPC .... H04W 52/14; H04W 52/386; H04L 5/0057
See application file for complete search history.

(56) References Cited

U.S. PATENT DOCUMENTS

| | | | |
|---|---|---|---|
| 2014/0200012 A1* | 7/2014 | Ito .......................... | H04W 24/02 455/450 |
| 2014/0219255 A1* | 8/2014 | Eyuboglu ............. | H04W 72/12 370/336 |

(Continued)

*Primary Examiner* — Romani Ohri

(57) ABSTRACT

Embodiments herein provide a method implemented in a cloud radio access network (C-RAN). The method includes transmitting channel state information (CSI) reference signals to plurality of user equipments (UEs). The method includes receiving a measured downlink (DL) CSI from each UE among the plurality of UEs. The DL CSI corresponds to a plurality of antenna ports associated with a set of remote radio heads (RRHs) in cluster. Further, the method includes estimating an uplink (UL) CSI for each UE antenna port. The UL CSI is estimated using a pre-defined pilot structure received from each UE. The DL CSI or UL CSI is defined with respect to BS and UE antenna port pair. Furthermore, the method includes deriving a calibration coefficient for each antenna port based on measured DL CSI and estimated UL CSI. The calibrated DL CSI is used to precoder the data using a linear or non-linear precoder.

8 Claims, 13 Drawing Sheets

(56) References Cited

U.S. PATENT DOCUMENTS

| | | | |
|---|---|---|---|
| 2014/0247796 A1* | 9/2014 | Ouchi | H04L 5/0053 |
| | | | 370/329 |
| 2014/0269502 A1* | 9/2014 | Forenza | H04B 17/12 |
| | | | 370/328 |
| 2016/0234858 A1* | 8/2016 | Bao | H04W 72/12 |
| 2016/0323029 A1* | 11/2016 | Cheng | H04B 7/0626 |
| 2016/0337049 A1* | 11/2016 | Dhakal | H04B 15/02 |
| 2017/0117996 A1* | 4/2017 | Lorca Hernando | H04L 5/0073 |
| 2017/0135039 A1* | 5/2017 | Takeda | H04W 16/32 |
| 2018/0019795 A1* | 1/2018 | Zhang | H04B 7/0897 |
| 2019/0074876 A1* | 3/2019 | Kakishima | H04L 5/0007 |

* cited by examiner

METHOD AND APPARATUS FOR A CLUSTER SPECIFIC CLOUD RADIO TRANSMISSION AND RECEPTION

FIELD OF INVENTION

The embodiments herein relate to a wireless communication network. More particularly relates to a method and apparatus for a cluster specific cloud radio transmission and reception. The present application is based on, and claims priority from an Indian Application Number 201641024178 filed on 14 Jul. 2016, the disclosure of which is hereby incorporated by reference.

BACKGROUND OF INVENTION

In next generation of cloud communication technology, wireless network architecture includes a large group of antenna ports (ATPs) which are connected to a central processor (or a remote base station (RBS)) that performs baseband processing for the entire wireless network. The wireless network architecture includes a number of remote radio heads (RRHs) which may be either collocated or distributed. Each RRH includes multiple antenna ports that are used to transmit signals using spatially separated antennas. The architecture may include a set of massive multi-input multi-output (MIMO) base stations connected to a core network or a cloud radio with distributed RRHs. In case of massive MIMO, the cloud becomes highly localized cloud that performs baseband processing for all the antenna ports. In case of cloud radio access network (RAN) joint processing can be performed for a group of RRHs resulting in a cluster. Clusters of clouds encompass a cloud network.

Availability of baseband signals corresponding to all user equipment (UEs) in the cloud network provides multiple advantages including simplified user scheduling, automatic load balancing or the like. As the density of the RRHs increase, transmit power of base station (BS) can be reduced to low values without compromising the network performance In conventional networks, such high density deployment may lead to frequent handovers.

In conventional systems, the BS employs spatial multiplexing (SM) techniques using multiple antennas in downlink (DL). Similarly, the cloud radio can be designed to handle multi-stream transmission from each transmission port (TP). In the cloud radio, the network may assign the base station identification (BS ID) number to a group of antenna ports while individual antenna ports may be provided with a unique antenna port number. In conventional Heterogeneous networks (HetNets), the cloud radio with a plurality of macro cells and pico cells illustrates a HetNet cloud radio. The third generation partnership project (3GPP) introduced HetNets in Release-10 of the long term-evolution (LTE) standard. The HetNets allow deployment of small cells (Pico cells and Femto cells). All the cells can fully utilize entire available bandwidth in universal frequency reuse-one mode. The introduction of Pico cells within the coverage area of a Macro cell leads to mutual interference between the Macro and Pico cells.

Due to practical considerations, a finite set of BSs/ATPs/RRHs are connected to one cloud and other sets of BSs/ATPs/RRHs are connected to other clouds forming clusters of cloud radios. In such scenarios, cooperation is applied to BSs/ATPs/RRHs within a cluster. Because of limited cooperation, interference arises at the UE due to other cluster interference in the downlink.

To mitigate intra-cluster interference, channel state information (CSI) of BSs/ATPs/RRHs which belong to the same cluster is needed. However, since the cloud may use centralized precoding to eliminate intra-cluster interference, there may not be a need to obtain CSI of BSs/ATPs/RRHs that belong to neighboring clusters. The inter-cluster scheduling can be used to mitigate inter-cluster interference when the UE feedback the IDs of BS that are present in the neighboring clusters but can cause dominant interference to the UE.

In the cloud radio systems employing different carrier frequencies for downlink and uplink called a frequency division duplex (1-DD) cloud radio, the CSI of downlink channels are fed back by the UEs to the BS with regular periodicity resulting in high overhead. However, in cloud radio systems employing time division duplexing (TDD) the available frequency resources are used between downlink and uplink in TDD mode. In such cases, the CSI of downlink channel can be obtained from the CSI measurements obtained from the uplink. However, since the RF filters used in the downlink and uplink transmission paths can be different, the measured downlink CSI differs from that of uplink CSI. There is a need to apply a frequency dependent correction factor to the uplink measured CSI to obtain downlink CSI.

The above information is presented as background information only to help the reader to understand the present invention. Applicants have made no determination and make no assertion as to whether any of the above might be applicable as prior art with regard to the present application.

SUMMARY

The principal object of the embodiments herein is to provide a method and apparatus for a cluster specific cloud radio transmission and reception.

Another object of the embodiments herein is to provide a method for reporting cluster specific CSI feedback for a cloud radio.

Another object of the embodiments herein is to provide method of interference free communication in downlink of cloud RAN or Massive MIMO.

Another object of the embodiments herein is to provide a method for pilot transmission and method for obtaining downlink CSI through calibration of uplink CSI, signal processing and coding.

Another object of the embodiments herein is to provide a high network capacity with better quality of service (QoS).

Accordingly the embodiments herein provide a method implemented in a cloud radio access network (C-RAN). The method includes transmitting a channel state information (CSI) reference signals to a plurality of user equipment (UEs). The method includes receiving a measured downlink (DL) CSI from each UE among the plurality of UEs. The DL CSI corresponds to a plurality of antenna ports associated with a set of remote radio heads (RRHs) in a cluster. Further, the method includes estimating an uplink (UL) CSI for each UE antenna port. The UE may employ multiple antenna ports for reception or for transmission. The DL CSI or UL CSI is defined with respect to a BS and UE antenna port pair. The UL CSI is estimated using a pre-defined pilot structure received from each UE antenna port. Furthermore, the method includes deriving a calibration coefficient for each RRH and UE antenna port pair based on the measured DL CSI and the estimated UL CSI.

The method includes transmitting data to each UE by precoding with diagonal element signaling (DES) pilots through the RRH.

Accordingly the embodiments herein provide a method implemented in a user equipment (UE). The method includes transmitting a measured downlink (DL) CSI to a cloud radio access network (C-RAN). The DL CSI corresponds to a plurality of antenna ports associated with a set of remote radio heads (RRHs).

Further, the method includes receiving a signal from a RRH along with diagonal element signaling (DES) pilots. The received signal includes data intended to the UE. The method includes estimating diagonal elements using the DES pilots in the received signal. The method includes retrieving the data from the signal based on the estimates obtained using DES pilots.

In an embodiment, receiving the signal from the RRH along with diagonal element signaling (DES) pilots includes transmitting an uplink (UL) sounding signal with a pre-defined pilot structure to the cloud RAN.

Accordingly the embodiments herein provide a cloud radio access network (C-RAN). The cloud radio access network includes a reference signals transmission unit configured to transmit a channel state information (CSI) reference signals to a plurality of user equipment (UEs). The C-RAN includes a downlink CSI reception unit configured to receive a measured downlink (DL) CSI from each UE among the plurality of UEs. The DL CSI corresponds to a plurality of antenna ports associated with a set of remote radio heads (RRHs) in a cluster. The C-RAN includes an uplink CSI estimation unit configured to estimate an uplink (UL) CSI for each UE antenna port. The UL CSI is defined with respect to a BS and UE antenna port pair. The UL CSI is estimated using a pre-defined pilot structure received from each UE antenna port.

Further, the C-RAN includes a calibration coefficient derivation unit configured to derive a calibration coefficient for each RRH and UE antenna port pair based on the measured DL CSI and the estimated UL CSI.

Accordingly the embodiments herein provide user equipment (UE) which includes a downlink CSI transmission unit configured to transmit a measured downlink (DL) CSI to a cloud radio access network (C-RAN). The DL CSI corresponds to a plurality of antenna ports associated with a set of remote radio heads (RRHs). The DL CSI is defined with respect to a BS and UE antenna port pair.

Accordingly the embodiments herein provide a computer program product comprising computer executable program code recorded on a computer readable non-transitory storage medium. The computer executable program code when executed causing the actions including transmitting a channel state information (CSI) reference signals to a plurality of user equipment (UEs). The computer executable program code when executed causing the further actions including receiving a measured downlink (DL) CSI from each UE among the plurality of UEs. The DL CSI corresponds to a plurality of antenna ports associated with a set of remote radio heads (RRHs) in a cluster. The computer executable program code when executed causing the further actions including estimating an uplink (UL) CSI for each UE antenna port, wherein the UL CSI is estimated using a pre-defined pilot structure received from each UE antenna port. The computer executable program code when executed causing the further actions including deriving a calibration coefficient for each RRH and UE antenna port pair based on the measured DL CSI and the estimated UL CSI.

Accordingly the embodiments herein provide a computer program product comprising computer executable program code recorded on a computer readable non-transitory storage medium. The computer executable program code when executed causing the actions including transmitting a measured downlink (DL) CSI to a cloud radio access network (C-RAN). The DL CSI corresponds to a plurality of antenna ports associated with a set of remote radio heads (RRHs). The DL CSI is defined with respect to a BS and UE antenna port pair.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

Figure 1:
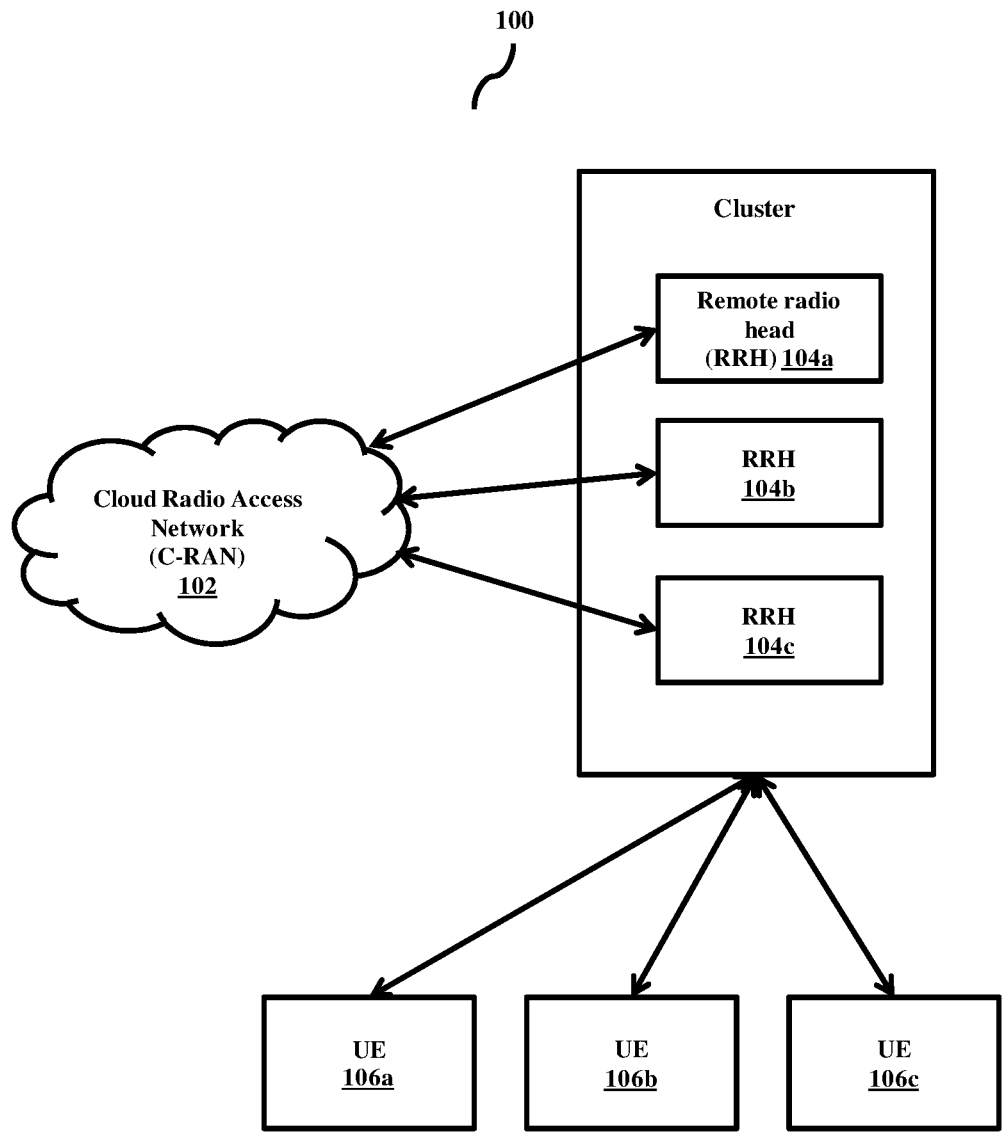
FIG. 1 is a high level architecture of a cloud radio access network (C-RAN), according to the embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

The embodiments herein achieve a method implemented in a cloud radio access network (C-RAN). The method includes transmitting a channel state information (CSI) reference signals to a plurality of user equipment (UEs). The method includes receiving a measured downlink (DL) CSI from each UE among the plurality of UEs. The DL CSI corresponds to a plurality of antenna ports associated with a set of remote radio heads (RRHs) in a cluster. Further, the method includes estimating an uplink (UL) CSI for each UE antenna port. The UE may employ multiple antenna ports for reception or for transmission. The DL CSI or UL CSI is defined with respect to a RRH and UE antenna port pair The UL CSI is estimated using a pre-defined pilot structure received from each UE antenna port. Furthermore, the method includes deriving a calibration coefficient for each RRH and UE antenna port pair based on the measured DL CSI and the estimated UL CSI.

Unlike the conventional methods, the proposed method can be used to achieve interference free communication in the C-RAN. The sounding reference signals are requested from the UEs by the C-RAN before scheduling grant to the UEs. The cluster cloud/RRH/BS may indicate the uplink time/frequency resources for the UE before start of downlink data transmission. With the proposed method, the cluster cloud/RRH/BS calibrates the uplink measured CSI using the per UE calibration coefficient for each subcarrier/resource. Further, the clustered cloud applies linear precoding or non-linear precoding based on the calibrated channel matrix. In an embodiment, Tomilson-Harashima precoding (THP) is used at the C-RAN/RRH/BS. For the case of linear precoding, the C-RAN precodes the pilots using a linear precoder W.

Referring now to the drawings and more particularly to FIGS. 1 through 10, where similar reference characters denote corresponding features consistently throughout the figures, there are shown preferred embodiments.

FIG. 1 is a high level architecture of a cloud radio access network (C-RAN), according to the embodiments as disclosed herein. As depicted in the FIG. 1, the architecture 100 includes a C-RAN 102, a set of RRHs 104a, 104b and 104c and a plurality of UEs 106a, 106b and 106c. The set of RRHs 104a, 104b and 104c form a cluster and communicate with the C-RAN 102. Each RRH includes multiple antenna ports that are used to transmit signals using spatially separated antennas. The C-RAN 102 is a cloud system which performs central processing of the base band associated with the set of RRHs. The C-RAN 102 performs joint processing for the set of RRHs 104a, 104b and 104c in the cluster. The UEs 106a, 106b and 106c may employ multiple antenna ports for reception or for transmission. Although in the FIG. 1, only one cluster is shown, it should be noted that the architecture 100 includes a plurality of clusters, where each cluster includes a set of RRHs.

In an embodiment, the C-RAN 102 derives the calibration coefficient for each antenna port based on DL CSI obtained from each UE and the estimated UL CSI for each UE antenna port. The DL CSI or UL CSI is defined with respect to a RRH and UE antenna port pair. Further, the C-RAN 102 transmits data to each of the UE (i.e., the UE 106a, the UE 106b and the UE 106c). The various steps involved in deriving the calibration coefficient for each antenna port associated with the set of RRHs in the cluster are described in the FIG. 3.

Figure 2:
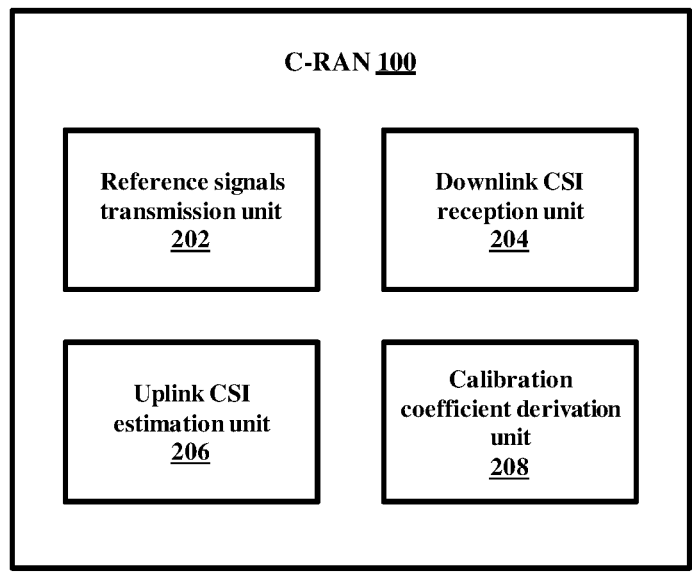
FIG. 2 illustrates various units in the C-RAN, according to the embodiments as disclosed herein.

FIG. 2 illustrates various units in the C-RAN 102, according to the embodiments as disclosed herein. As depicted in the FIG. 2, the C-RAN 102 includes a reference signals transmission unit 202, a DL CSI reception unit 204, a UL CSI estimation unit 206 and a calibration coefficient derivation unit 208.

The reference signals transmission unit 202 is configured to transmit downlink calibration CSI reference signals using a pre-defined pilot structure to a single or a group of UEs for CSI reporting. The CSI reporting periodicity is determined by the C-RAN 102. The DL CSI reception unit 204 is configured to receive the measured DL CSI from each of the UE 106a, 106b and 106c. The measured DL CSI corresponds to the antenna ports of a set of RRHs that belong to the cluster. The UEs 106a, 106b and 106c determine RRHs with the highest received power (ranks signal power of L RRHs/BSs in an order). The DL CSI measurements are performed either for all the antenna ports or a subset of antenna ports in each RRH. The DL CSI or the UL CSI is defined with respect to a BS and UE antenna port pair.

The UL CSI estimation unit 206 is configured to estimate the UL CSI for each UE antenna port. The UL CSI is estimated using a pre-defined pilot structure received from each UE. The UL CSI estimation is configured to send a request message to a single or a plurality of UEs to transmit uplink calibration sounding signals using the pre-defined pilot structure.

The calibration coefficient derivation unit 208 is configured to derive the calibration coefficient for each antenna port based on reported downlink CSI values and the measured uplink CSI value for a frequency subcarrier or resource. The derived calibration coefficients are valid for longer periods of time. The calibration coefficient derivation unit derives the calibration coefficient for each UE antenna port based on the requirements.

Figure 3:
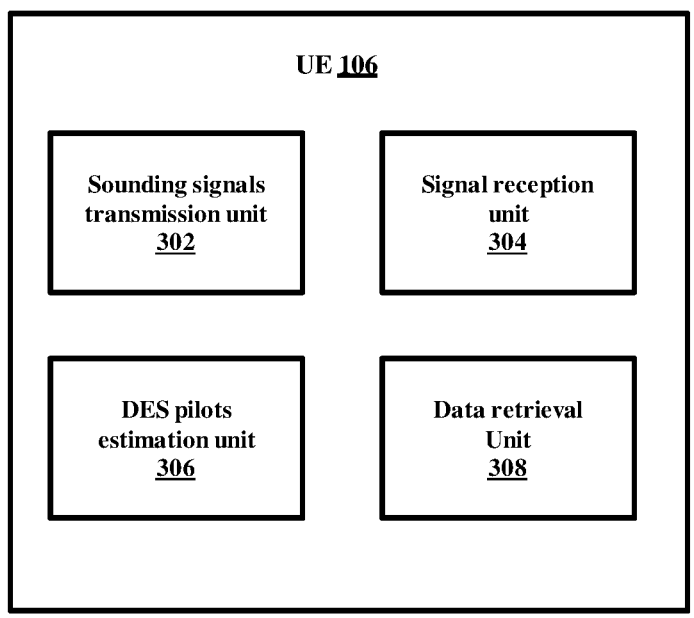
FIG. 3 illustrates various units in a user equipment (UE), according to the embodiments as disclosed herein.

FIG. 3 illustrates various units in user equipment (UE) 106, according to the embodiments as disclosed herein. As depicted in the FIG. 3, the UE 106 includes a DL CSI transmission unit 302, sounding signals transmission unit 304, signal reception unit 306, a pilots estimation unit 308 and a data retrieval unit 310.

The DL CSI transmission unit 302 transmits the DL CSI to the C-RAN 102. The DL CSI corresponds to the antenna ports of a set of RRHs that belong to the cluster. The DL CSI transmission unit 302 determines RRHs with the highest received power (ranks signal power of L RRHs/BSs in an order).

The sounding signals transmission unit 304 transmits sounding signals to the C-RAN 102. The sounding signals transmission unit 304 transmits uplink sounding reference signals (USRS) to facilitate downlink channel estimation and THP precoding using uplink pilots.

In an embodiment, the USRS are transmitted with certain periodicity

In an embodiment, the USRS are transmitted when the cloud-RAN signals the UE 106 to transmit these signals.

The sounding signals transmission unit 304 further transmits uplink reference signals (ULRS) that are used by the cluster cloud for obtaining precoder information as well as for uplink signal demodulation. Since the downlink packet arrival is random and uplink and downlink traffic may also be generated at random time intervals, the ULRS can be a fixed pattern that is transmitted every y ms. Example values for y are 1, 2 and so on. The users can be multiplexed in frequency as well as in time for ULRS transmission. The ULRS can be used for obtained downlink precoder and/or for uplink multi-user channel estimation and multi-user detection.

The signal reception unit 306 receives the signal from the RRH along with diagonal element signaling (DES) pilots. The received signal includes data intended to the UE. The received signal includes data intended to the UE 106. The received signal is sent to the pilot estimation unit for estimating the diagonal elements using the DES pilots.

In an embodiment, the DES pilot pattern is designed to track the diagonal elements that exhibit frequency selectivity. The DES pilot pattern is chosen to be an orthogonal pattern. The pattern may be designed to track the channel every 90 KHz or 180 KHz. Further, different users may be scheduled in different time-frequency resources. DES may also be a fixed pattern where multiple users may be multiplexed in frequency as well as in time.

The pilots estimation unit 308 estimates the diagonal elements using the DES pilots in the received signal. The pilots are precoded with 'Q' matrix and transmits the signal to the scheduled UEs to enable estimation of diagonal elements of the L matrix of LQ decomposition of H matrix.

The data retrieval unit 310 retrieves data from the received signal based on the estimated DES pilots. The estimate of diagonal elements is performed for each subcarrier/frequency resource. Further, the data retrieval unit 310 applies THP decoding for each subcarrier/frequency resource for retrieving data.

Figure 4:
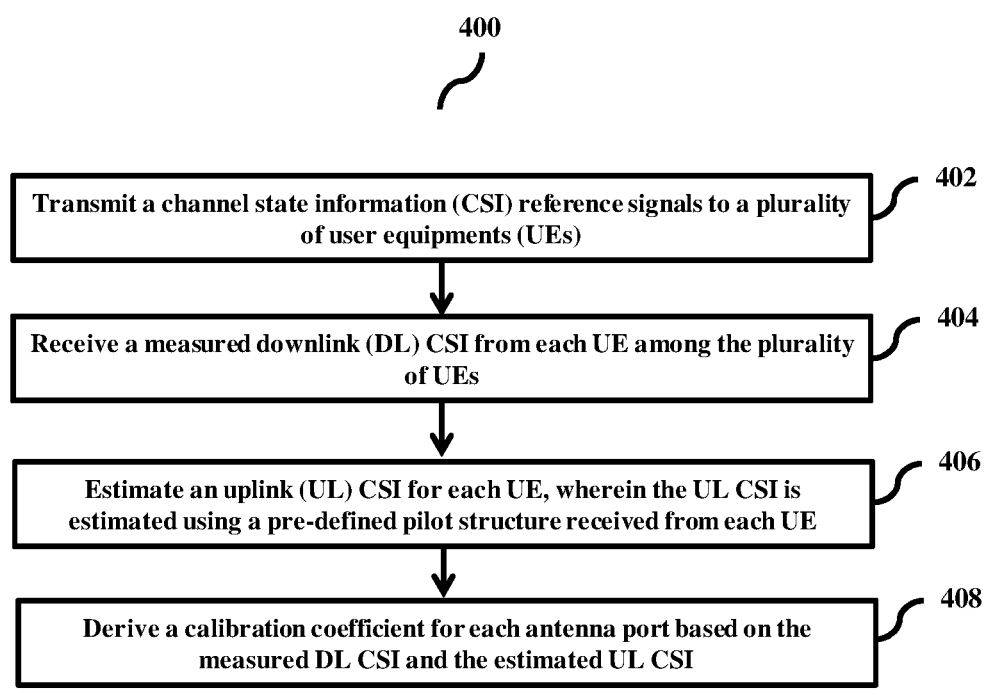
FIG. 4 is a flow chart illustrating a method for deriving calibration coefficient for each antenna port by the C-RAN, according to the embodiments as disclosed herein.

FIG. 4 is a flow chart 400 illustrating a method for deriving calibration coefficient for each antenna port by the C-RAN, according to the embodiments as disclosed herein. At step 402, the method includes transmitting the CSI reference signals to the plurality of UEs 106a, 106b and 106c. The method allows the reference signals transmission unit 202 to transmit the CSI reference signals to the plurality of UEs 106a, 106b and 106c. The C-RAN 102 transmits downlink calibration CSI reference signals using a per-defined pilot structure to a single UE 106a or a group of UEs 106a, 106b and 106c for CSI reporting.

In an embodiment, the CSI reporting periodicity is determined by the C-RAN 102.

At step 404, the method includes receiving the measured DL CSI from each UE among the plurality of UEs 106a, 106b and 106c. The method allows the DL CSI reception unit 204 to receive the measured DL CSI from each UE among the plurality of UEs 106a, 106b and 106c. The plurality of UEs may employ multiple antenna ports for reception or for transmission. The DL CSI corresponds to the plurality of antenna ports associated with the set of RRHs in the cluster. The DL CSI is defined with respect to a BS and UE antenna port pair. The DL CSI transmission unit 302 determines the RRHs with the highest received power (ranks signal power of L RRHs/BSs in an order).

At step 406, the method includes estimating the UL CSI for each UE antenna port. The method allows the UL CSI estimation unit to estimate the UL CSI for each UE antenna port. The UL CSI is defined with respect to a BS and UE antenna port pair. The UL CSI is performed at the cloud using the ULRS signals collected from RRHs. ULRS may comprise of reference signals transmitted from the antenna ports of the UEs. The ULRS may use pilots patterns that are orthogonal in time/frequency/code.

At step 408, the method includes deriving the calibration coefficient for each antenna port based on the measured DL CSI and the estimated UL CSI. The method allows the calibration coefficient derivation unit to derive the calibration coefficient for each antenna port based on the measured DL CSI and the estimated UL CSI. The C-RAN 102/RRH/BS derives a calibration coefficient for each antenna port, based on reported downlink CSI values and the measured uplink CSI value for a given frequency subcarrier or resource.

The derivation of calibration coefficient is as described herein. Consider the noiseless downlink channel CSI for a given subcarrier 'f' of an antenna port as $$Hd(f)=Hp(f)M(f) \qquad (1)$$

where Hp(f) is the propagation channel coefficient, M(f) is the channel response associated with filters of downlink RF chains. Consider the noiseless uplink channel for the same subcarrier as $$Hu(f)=Hp(f)N(f) \qquad (2)$$

Where N(f) is the channel response associated with filters of uplink RF chain.

The C-RAN 102 computes the calibration coefficient as the ratio $$C(f)=Hd(f)/Hu(f)=M(f)/N(f) \qquad (3)$$

Since the characteristics of the filter remain constant over a period of time, C(f) needs to be computed in frequently. Consider Hu1(f) denote noise less uplink channel mesured at an arbitrary time instant t1.

$$Hu1(f)=Hp1(f)N(f) \qquad (4)$$

where Hp1(f) is the propagation channel. The corresponding downlink channel can be obtained by calibrating the uplink channel CSI as $$Hd1(f)=Hu1(f)C(f)=Hp1(f)M(f) \qquad (5)$$

The calibration coefficients need not be obtained for every subcarrier frequency. The frequency variaitons of C(f) may be low. For example, C(f) may be estimated over multiple of 180 KHz (one resource block (RB) in LTE). In this case, DCRS can be transmitted with low overhead even for the case of large number of RRHs. For example 20-30 antenna ports (distributed over multiple RRHs) can be trained using 2-3 OFDM symbols. A similar pattern can be designed in the uplink. An overhead of 2-3 OFDM symbols in a frame may be justified. The cluster cloud need to indicate to each user the pilot positions over which each UE is allowed to transmit. This position may be signed explicity to the user or may be indicated during RACH process.

In an embodiment, calibration is achieved using uplink calibration reference signals (UCRS) or uplink demodulation reference signals (DMRS). In an embodiment, the UE feeds back the CSI of transmit antenna ports of the cluster cloud explicitly. The uplink calibration reference signals are transmitted by the UE in its designed uplink position. The DCRS and UCRS patterns can be fixed in the time frequency plane with minimal time gap between DCRS and UCRS. The cluster cloud obtains calibration coefficient as soon as it received UCRS. DCRS and UCRS can be transmitted infrequently with low overhead, for e.g once every x ms. Example values of x are 1, 2 etc. In order to avoid scheduling delay, DCRS and UCRS can be transmitted with the same frequency as a PSS signal. The UCRS can be fixed pattern where multiple users can be multiplexed in frequency as well as in time.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

Figure 5:
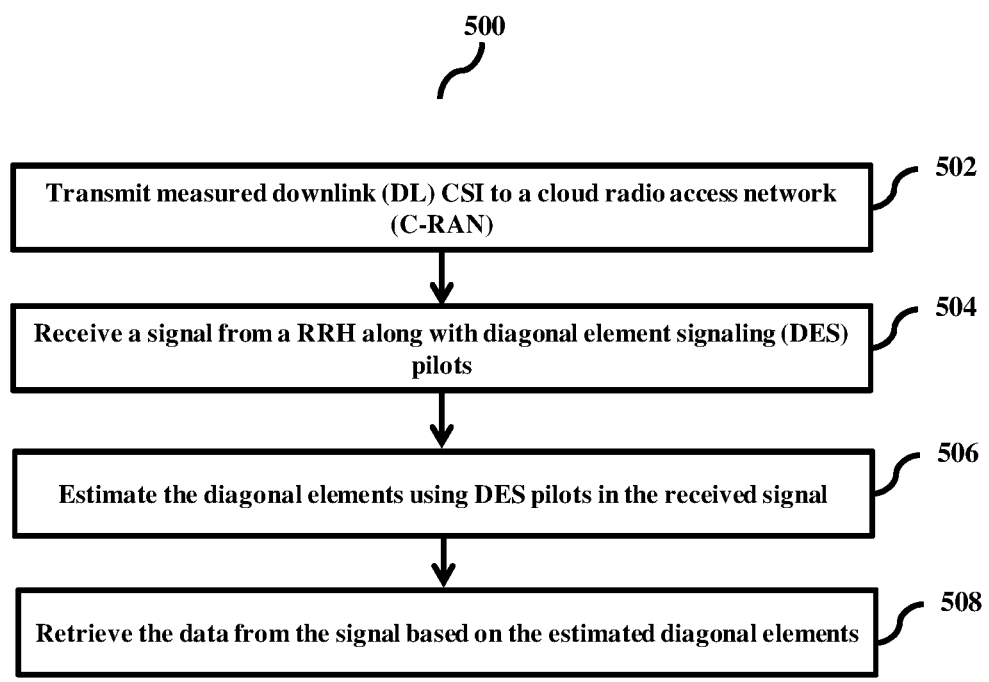
FIG. 5 is a flow diagram illustrating a method for retrieving data by the UE, according to the embodiments as disclosed herein.

FIG. 5 is a flow diagram illustrating a method for retrieving data by the UE, according to the embodiments as disclosed herein. At step 502, the method includes transmitting the measured DL CSI to the C-RAN 102. The method allows the DL CSI transmission unit to transmit the measured DL CSI to the C-RAN 102. The DL CSI corresponds to the to the antenna ports of a set of RRHs that belong to the cluster.

Initially, the UE 106a performs synchronization in the downlink using a synchronization channel. The synchronization channel may be common to the cluster or specific to one RRH or a set of RRHs, or one BS. One RRH may employ multiple antennas. Alternatively, one BS may employ multiple antenna ports and the UE 106a may have multiple antenna ports.

After performing the synchronization in the downlink using the synchronization channel, the UE 106a associates with either the cluster cloud or specific to one RRH or a group of RRHs, or one BS. Further, the UE 106a measures the CSI corresponding to the antenna ports of a set of RRHs/BSs that belong to the cluster and determines L RRHs/BSs with the highest received power (ranks signal power of L RRHs/BSs in an order). In an example, the UE 106a performs DL CSI measurements either for all the receiver antenna ports or a subset of receiver antenna ports.

In an embodiment, the DL CSI of either all the antenna ports or the subset of antenna ports of selected RRH/BS is quantized to a number of bits using a quantization process. The CSI corresponding to a number of subcarriers, or a set of frequency resources is jointly quantized. The quantized bits along with the IDs of RRHs/BSs are coded using an encoding scheme and are transmitted to the RRHs/BS/C-RAN 102 using an uplink channel in a time-frequency resource scheduled by the C-RAN 102/RRHs 104a-104c/BS.

At step 504, the method 500 includes receiving the signal from the RRH along with DES pilots. The method allows the signal reception unit 306 to receive the signal from the RRH along with the DES pilots. The received signal includes data intended to the UE. The received signal includes data intended to the UE 106.

In an embodiment, the UE 106 receives a request to transmit uplink calibration sounding signals to the C-RAN with a pre-defined pilot structure. In response to the received request, the uplink (UL) sounding signal is transmitted to the C-RAN 102.

At step 506, the method includes estimating the diagonal elements using the DES pilots in the received signal. The method allows the pilots estimation unit 308 to estimate the diagonal elements using DES pilots in the received signal.

At step 508, the method includes retrieving the data from the signal based on the estimated DES pilots. The method allows the data retrieval unit to retrieve the data from the signal based on the estimated diagonal elements. The method for estimating the diagonal elements using DES pilots in the received signal and the retrieving the data based on the estimated diagonal elements is described in conjunction with the examples in the FIGS. 8a-8c and the FIGS. 9a-9c.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

Figure 6:
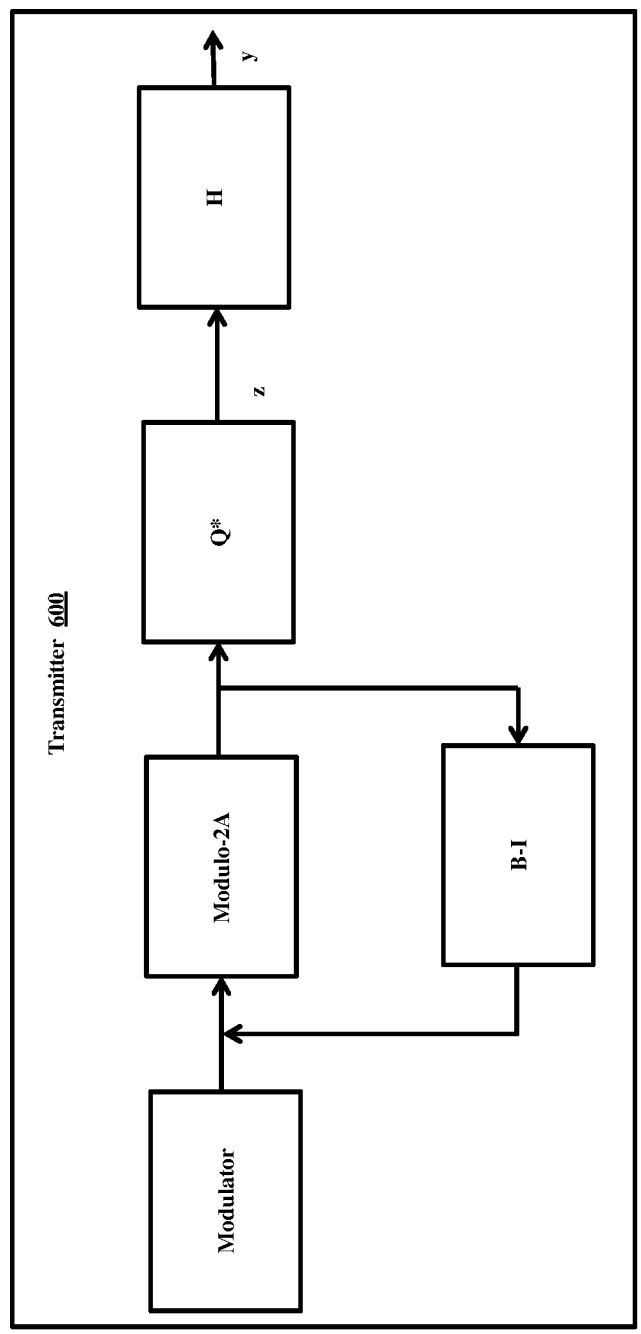
FIG. 6 illustrates schematic of a transmitter in the C-RAN, according to the embodiments as disclosed herein.

FIG. 6 illustrates schematic of a transmitter 600 in the C-RAN, according to the embodiments as disclosed herein. In the cloud radio systems, precoding schemes are be sub-divided into linear and nonlinear precoding types. The capacity achieving schemes are nonlinear, but linear precoding approaches usually achieves reasonable performance with much lower complexity. Linear precoding schemes include maximum ratio transmission (MRT), zero-forcing (ZF) precoding, and transmit Wiener precoding. Nonlinear precoding is designed based on the concept of dirty paper coding (DPC), which shows that any known interference at the transmitter can be subtracted without the penalty of radio resources if the optimal precoding scheme can be applied on the transmit signal. DPC is practically not realizable because of complexity, hence a system close to DPC and also practically realizable is needed, and THP is the one which can be used. In the THP, transmit power is more compared to DPC. But the power increase is less for large constellations. Therefore THP can provide near optimal performance.

Received signal vector: The cloud radio which is a collection of k RRHs/BSs selects k UEs i.e., one UE is chosen from a pool of active UEs associated with each BS (using round-robin strategy). The cloud radio transmits k distinct data streams. Assume k=3. Generation to more than 3 RRHs/BS will follow. Hence, the received signal vector in downlink is given as:

$$y = Hx + n \quad (6)$$

where $y = [y_1 \ y_2 \ y_3]$ is the received signal vector, $$H = \frac{1}{\sqrt{K}} \begin{bmatrix} h_{11} r_{11}^{-\alpha/2} & h_{12} r_{12}^{-\alpha/2} & h_{13} r_{13}^{-\alpha/2} \\ h_{21} r_{21}^{-\alpha/2} & h_{22} r_{22}^{-\alpha/2} & h_{23} r_{23}^{-\alpha/2} \\ h_{31} r_{31}^{-\alpha/2} & h_{32} r_{32}^{-\alpha/2} & h_{33} r_{33}^{-\alpha/2} \end{bmatrix} \quad (7)$$

where $x = [x_1 \ x_2 \ x_3]$ is the transmitted symbol vector with $E[|x_i|^2] = P_T$ and $n = [n_1 \ n_2 \ n_3]$, with $n_i \in CN(0,1)$ is AWGN. Expanding the equation (6) provides $$y_1 = \frac{1}{\sqrt{K}} (h_{11} r_{11}^{-\alpha/2} x_1 + h_{12} r_{12}^{-\alpha/2} x_2 + h_{13} r_{13}^{-\alpha/2} x_3) + n_1; \quad (7)$$

$$y_2 = \frac{1}{\sqrt{K}}(h_{21}r_{21}^{-\alpha/2}x_1 + h_{22}r_{22}^{-\alpha/2}x_2 + h_{23}r_{23}^{-\alpha/2}x_3) + n_2;$$

$$y_3 = \frac{1}{\sqrt{K}}(h_{31}r_{31}^{-\alpha/2}x_1 + h_{32}r_{32}^{-\alpha/2}x_2 + h_{33}r_{33}^{-\alpha/2}x_3) + n_3; \quad (5)$$

Each UE's received signal consists of signals received from the all the RRH/BSs. For first user, signals received from the RRH 104b and the RRH 104c are considered as interferences. The precoders are mainly designed to remove these interference effects.

The THP without modulo operation may incur a increased transmit signal power penalty. So modulo operator at the transmitter and receiver is employed to limit the magnitude of the transmitted symbol and this makes THP a non-linear scheme.

The THP precoder structure consists of a feedback and feedforward filter at the transmitter. The feedback filter cancels the interstream interference successively while the feedforward filter ensures that the noise at the decision devices is spatially white.

Modulo Operation: The Modulo Operation is used to limit the power of the transmitted signal. In THP, modulo-2 A operation is used. The modulo-2 A bounds the magnitude of the transmitted signal in [−A, A]. A is calculated as:

$$A = \left(\frac{M}{\frac{2*(M-1)}{3}}\right)^{1/2} \quad (8)$$

For QPSK, M=4 and A=1.4 For 16 QAM, M=16, A=1.26 For 64 QAM, M=64, A=1.23.

The symmetric modulo operation is defined as:

$$\mathrm{mod}_A(x) = x - 2A\left\lfloor \frac{x}{2A} \right\rfloor$$

The above modulo operation can be interpreted as a method to find integer values, m and n, such that the following inequalities are satisfied.

$$-A - jA \leq \mathrm{mod}_A(x) = x + 2Am + j2An \leq A + jA \quad (9)$$

The operation of the transmitter 700 is as described herein. The channel matrix H is decomposed to L and Q matrices using LQ decomposition where L is a lower triangular matrix and Q is a Unitary matrix. Practically, QR decomposition of H* is implemEnted. L and L values are derived from R* and Q*, where R is an upper triangular matrix. The QR decomposition always exists, even if the matrix does not have full rank, so the constructor will never fail. The primary use of the QR decomposition is in the least squares solution of non-square systems of simultaneous linear equations.

$$L = \begin{bmatrix} l_{11} & 0 & 0 \\ l_{21} & l_{22} & 0 \\ l_{31} & l_{32} & l_{33} \end{bmatrix} \quad (10)$$

B in the feedback filter is defined as $B = L * S^{-1}$
where S is a diagonal matrix whose diagonal entries same as that of L and $S^{-1}$ is the inverse of S. S is defined as:

$$S = \begin{bmatrix} l_{11} & 0 & 0 \\ 0 & l_{22} & 0 \\ 0 & 0 & l_{33} \end{bmatrix} \text{ and } S^{-1} \text{ as } S^{-1} = \begin{bmatrix} 1/l_{11} & 0 & 0 \\ 0 & 1/l_{22} & 0 \\ 0 & 0 & 1/l_{33} \end{bmatrix} \quad (11)$$

B is obtained as:

$$B = \begin{bmatrix} 1 & 0 & 0 \\ l_{21}/l_{22} & 1 & 0 \\ l_{31}/l_{33} & l_{32}/l_{33} & 1 \end{bmatrix} \quad (12)$$

i.e.

$$B_{21} = l_{21}/l_{22};$$

$$B_{31} = l_{31}/l_{33};$$

$$B_{32} = l_{32}/l_{33}; \quad (13)$$

B−I is a strictly lower triangular matrix. ie, diagonal elements have value as 0. From the FIG. 6, it can be inferred that.

$$-(B-I)\bar{x} + x = \bar{x} \quad (14)$$

By expanding the equation, it is obtained as $$\bar{x}_1 = \mathrm{mod}_{2A}(x_1);$$

$$\bar{x}_2 = \mathrm{mod}_{2A}(x_2 - B_{21}\bar{x}_1);$$

$$\bar{x}_3 = \mathrm{mod}_{2A}(x_3 - B_{31}\bar{x}_1 - B_{32}\bar{x}_2);$$

The transmitted vector z is: $z = Q^* * \bar{x}$ and the received vector y is as mentioned below.

$$y = H*z + n \quad (15)$$
$$= H*Q^* * Q^* * \bar{x} + n$$
$$= L*\bar{x} + n$$

Expanding the equation (6), Y provides $$y_1 = l_{11}\bar{x}_1 + n_1;$$

$$y_2 = l_{21}\bar{x}_1 + l_{22}\bar{x}_2 + n_2;$$

$$y_3 = l_{31}\bar{x}_1 + l_{33}\bar{x}_2 + l_{33}\bar{x}_3 + n_3; \quad (16)$$

Using modulo values for $\bar{x}$, implies $$y_1 = l_{11}\,\mathrm{mod}_{2A}(x_1) + n_1;$$

$$y_2 = l_{21}\,\mathrm{mod}_{2A}(x_1) + l_{22}\,\mathrm{mod}_{2A}(x_2 - B_{21}\,\mathrm{mod}_{2A}(x_1)) + n_2;$$

$$y_3 = l_{31}\,\mathrm{mod}_{2A}(x_1) + l_{32}\,\mathrm{mod}_{2A}(x_2 - B_{21}\,\mathrm{mod}_{2A}(x_1)) +$$
$$l_{33}\,\mathrm{mod}_{2A}(x_3 - B_{31}\,\mathrm{mod}_{2A}(x_1) - B_{32}\,\mathrm{mod}_{2A}(x_2 - B_{21}\,\mathrm{mod}_{2A}(x_1))) + n_3; \quad (17)$$

From the above equation (17), it can be inferred that all other terms except the signals from the corresponding BS cancels out for each UE's received signal. Consider the modulo values as:

$$\mathrm{mod}_{2A}(x_1) = x_1 + 2Aa + j2Ab;$$

$$\mathrm{mod}_{2A}(x_2) = x_2 + 2Ac + j2Ad;$$

$$\mathrm{mod}_{2A}(x_3) = x_3 + 2Ae + j2Af; \quad (18)$$

So the signals received by each UE is:

$$y_1 = l_{11}(x_1 + 2Aa + j2Ab) + n_1;$$

$$y_2 = l_{22}(x_2 + 2Ac + j2Ad) + n_2;$$

$$y_3 = l_{33}(x_3 + 2Ae + j2Af) + n_3; \quad (19)$$

Thus, the received signals become free from interference.

Figure 7:
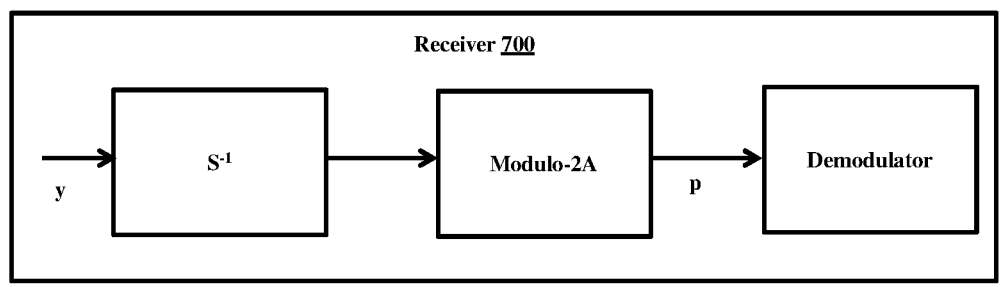
FIG. 7 illustrates a schematic of a receiver in the UE, according to the embodiments as disclosed herein.

FIG. 7 illustrates a schematic of a receiver 700 in the UE 106, according to the embodiments as disclosed herein. The operation of the receiver 700 is as described herein. Consider, $$\begin{bmatrix} P_1 \\ P_2 \\ P_3 \end{bmatrix} = \text{mod}_{2A}\left(S^{-1}\begin{bmatrix} y_1 \\ y_2 \\ y_3 \end{bmatrix}\right) \quad (20)$$

$$= \text{mod}_{2A}\left(\begin{bmatrix} 1/l_{11} & 0 & 0 \\ 0 & 1/l_{22} & 0 \\ 0 & 0 & 1/l_{33} \end{bmatrix}\begin{bmatrix} l_{11}(x_1 + 2Aa + j2Ab) + n_1 \\ l_{22}(x_2 + 2Ac + j2Ad) + n_2 \\ l_{33}(x_3 + 2Ae + j2Af) + n_3 \end{bmatrix}\right)$$

$$= \begin{bmatrix} x_1 \\ x_2 \\ x_3 \end{bmatrix} + \begin{bmatrix} \bar{n}_1 \\ \bar{n}_2 \\ \bar{n}_3 \end{bmatrix}$$

where effective noise at the receiver n is given by:

$$\begin{bmatrix} \bar{n}_1 \\ \bar{n}_2 \\ \bar{n}_3 \end{bmatrix} = \begin{bmatrix} \frac{n_1}{l_{11}} + 2Aa1 + j2Ab1 \\ \frac{n_2}{l_{22}} + 2Ac1 + j2Ad1 \\ \frac{n_3}{l_{33}} + 2Ae1 + j2Af1 \end{bmatrix} \quad (21)$$

It can be inferred from the equation (21) that the noise at the receiver 700 is scaled down by a factor corresponding to the channel characteristics. The demodulator input in the transmitter is same as that of modulator output at the receiver. ie, it ensures reliable communication in the cloud network.

Figure 8A:
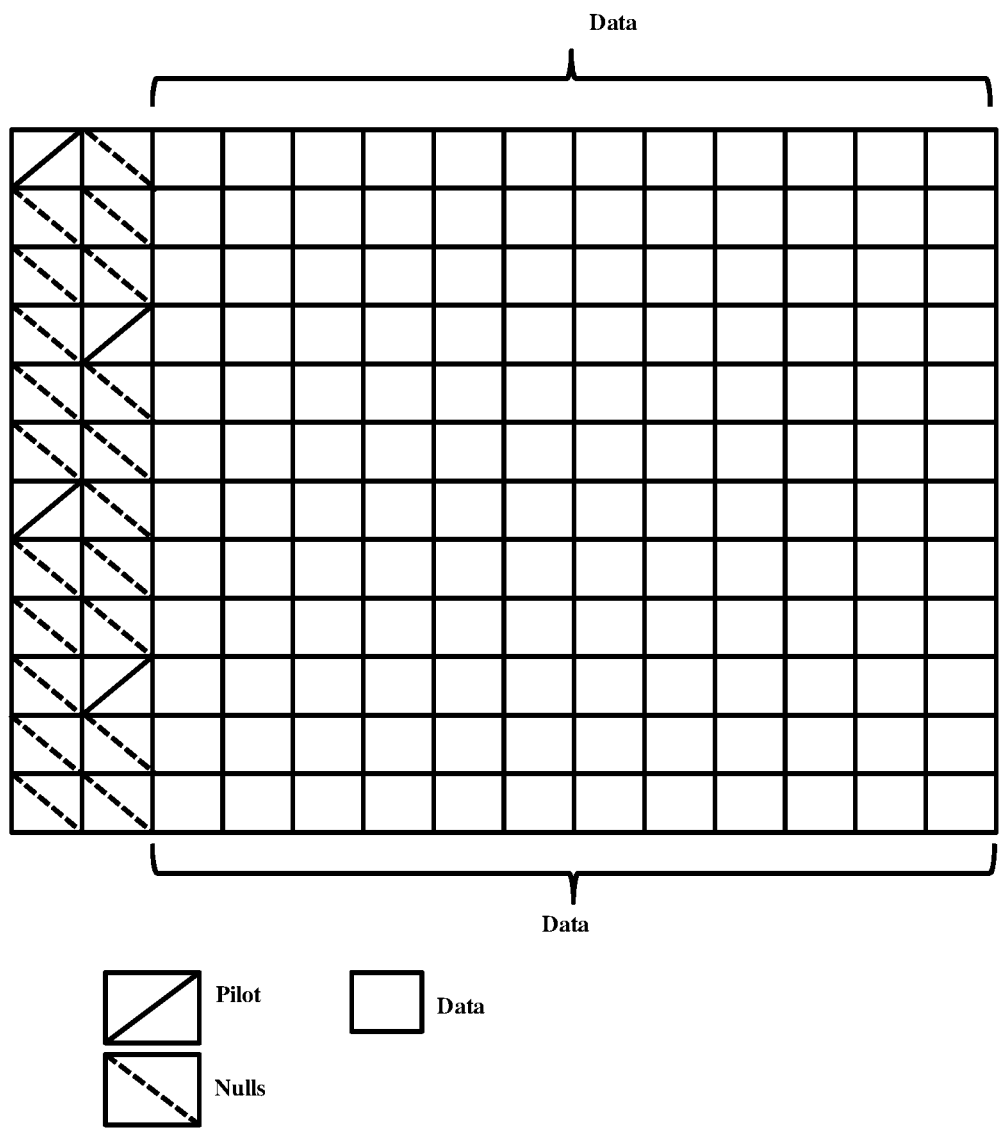
FIG. 8a illustrates an example subframe structure for a first remote radio head (RRH)/first base station, according to the embodiments as disclosed herein.

FIG. 8a illustrates an example subframe structure for a first remote radio head (RRH)/first base station, according to the embodiments as disclosed herein. The C-RAN 102 transmits downlink calibration reference signals (DCRS). The DCRS is a pre-defined signal, pre-known to both transmitter 600 and the receiver 700. For example, DLRS can be used during the first and second OFDM symbols as per the architecture as shown in the FIGS. 8a, 8b and 8c. These are different for each RRH. For illustration, Walsh matrix for pilots are used. Walsh matrix is a specific square matrix with dimensions of some power of 2, entries of 1 or −1, and the property that the dot product of any two distinct rows (or columns) is zero. In this case, a 2×2 Walsh matrix is needed.

Figure 8B:
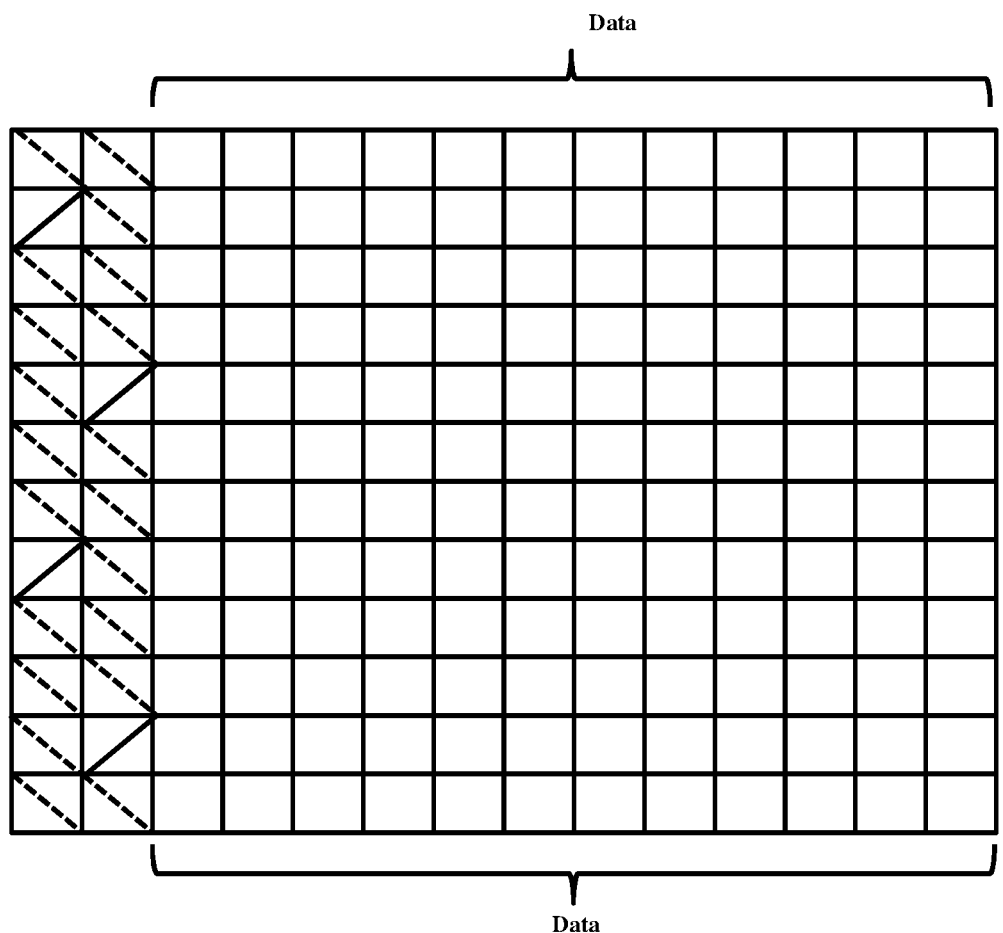
FIG. 8b illustrates an example subframe structure for a second RRH/second base station, according to the embodiments as disclosed herein.
Figure 8B:
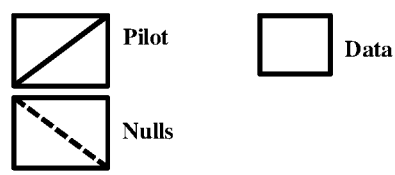

FIG. 8b illustrates an example subframe structure for a second RRH/second base station, according to the embodiments as disclosed herein.

Figure 8C:
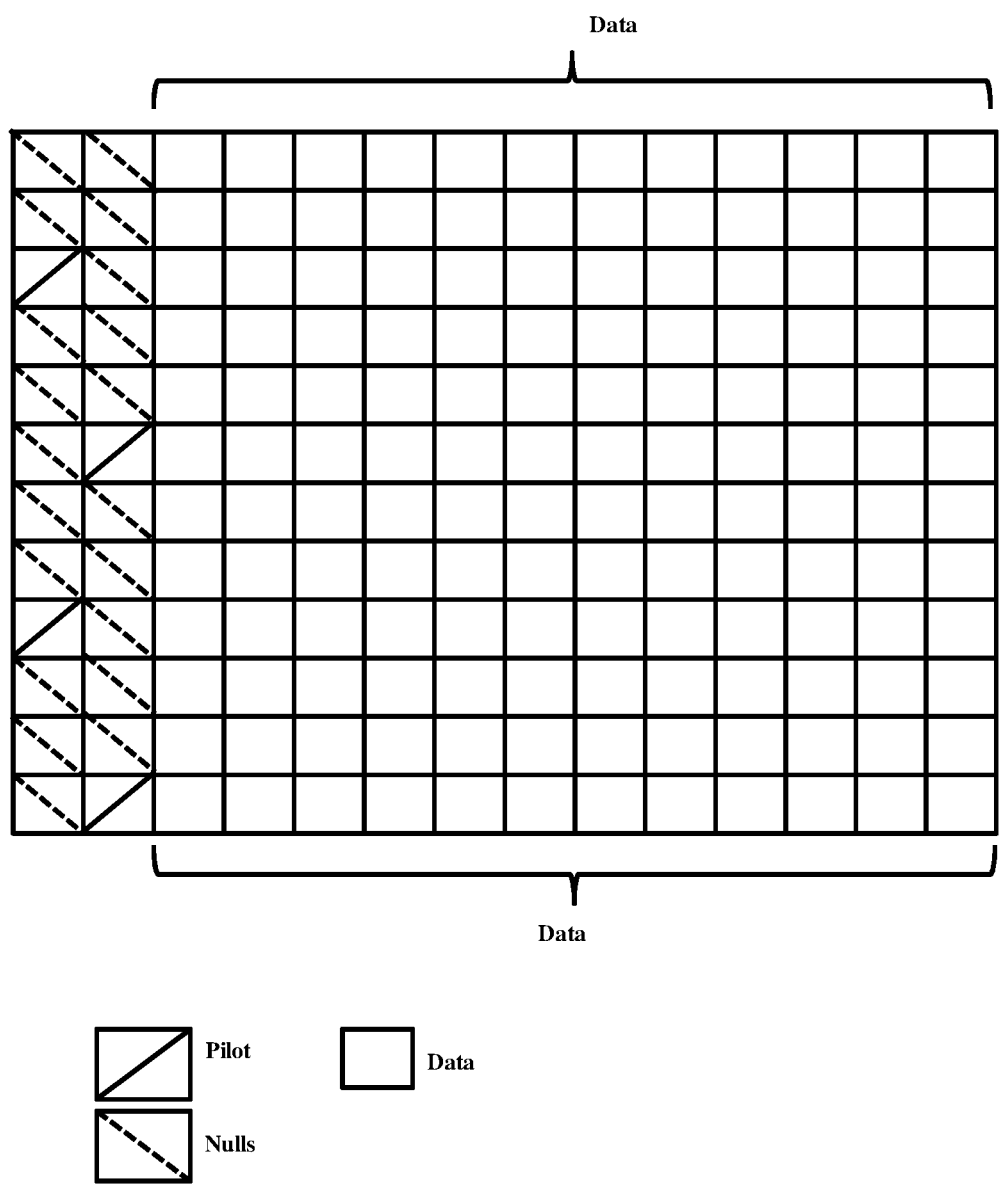
FIG. 8c illustrates an example subframe structure for a third RRH/thirdbase station, according to the embodiments as disclosed herein.

FIG. 8c illustrates an example subframe structure for a third RRH/third base station, according to the embodiments as disclosed herein.

The received pilot signals can be represented as:

$$Y_P = X_P H_P + N_P \quad (22)$$

where $(.)_P$ denotes positions where reference signals are transmitted. We may use least square (LS) channel estimation technique and interpolation as well.

The least square estimate (LS) of the channel at the pilot subcarriers given can be obtained by the following equation (23).

$$H_P^{LS} = (X_P)^{-1} Y_P \quad (23)$$

where $H_P^{LS}$ represents the least-squares (LS) estimate obtained over the pilot subcarriers. Channel is assumed to be the same for 3 consecutive subcarriers. Hence, 4 channels are associated with a resource block since 12 subcarriers come under one resource block.

Consider y1, y2 and y3 are the symbols (resource block) received by each user and x denotes pilot symbol which can take values 1 or −1.

Consider $H_1$ as the channel matrix corresponding to first 3 subcarriers. The channel from first UE to first BS is found by extracting the corresponding element of y1 and dividing it with the pilot symbol value in that position. Similarly channel estimates are extracted corresponding to other BSs. $H_1$ is represented by:

$$H_1 = \begin{bmatrix} \left(\frac{y1}{x}\right)_{11} & \left(\frac{y1}{x}\right)_{21} & \left(\frac{y1}{x}\right)_{31} \\ \left(\frac{y2}{x}\right)_{11} & \left(\frac{y2}{x}\right)_{21} & \left(\frac{y2}{x}\right)_{31} \\ \left(\frac{y3}{x}\right)_{11} & \left(\frac{y3}{x}\right)_{21} & \left(\frac{y3}{x}\right)_{31} \end{bmatrix} \quad (24)$$

Similarly, $H_2$, $H_3$, and $H_4$ can be calculated. The estimated channel coefficients are feedback to the cloud using uplink.

The proposed method can be extended to an arbitrary C-RAN 102 where a cluster comprising of k-RRHs/BSs uses a DCRS pattern. The DCRS may be transmitted over certain time-frequency resources to enable per-subcarrier channel estimation for k-RRHs/BSs.

Figure 9A:
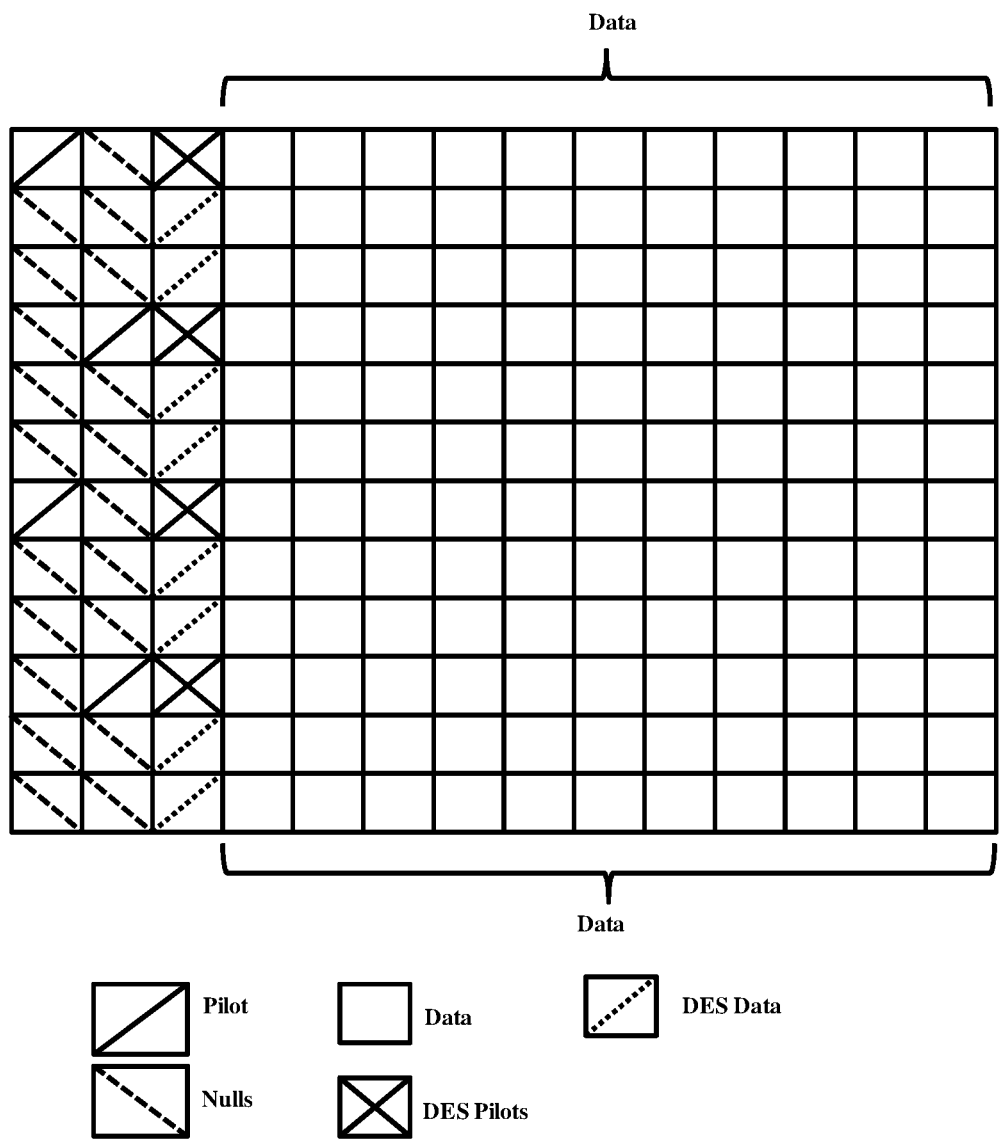
FIG. 9a illustrates an example structure of DES pilots and data for the first RRH/first base station, according to the embodiments as disclosed herein.

FIG. 9a illustrates an example structure of DES pilots and data for the first RRH/first base station, according to the embodiments as disclosed herein.

Figure 9B:
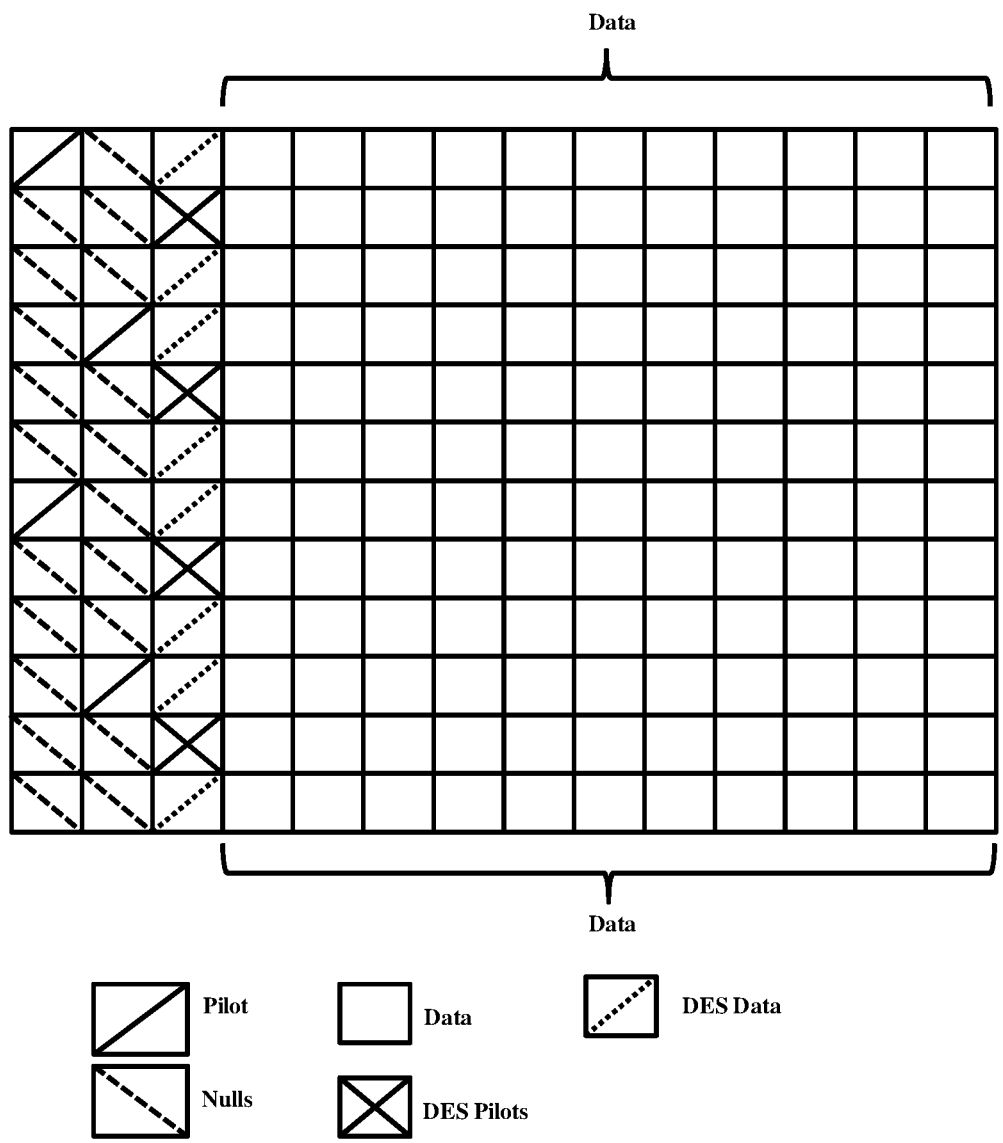
FIG. 9b illustrates an example structure of DES pilots and data for the second RRH/second base station, according to the embodiments as disclosed herein.

FIG. 9b illustrates an example structure of DES pilots and data for the second RRH/second base station, according to the embodiments as disclosed herein.

Figure 9C:
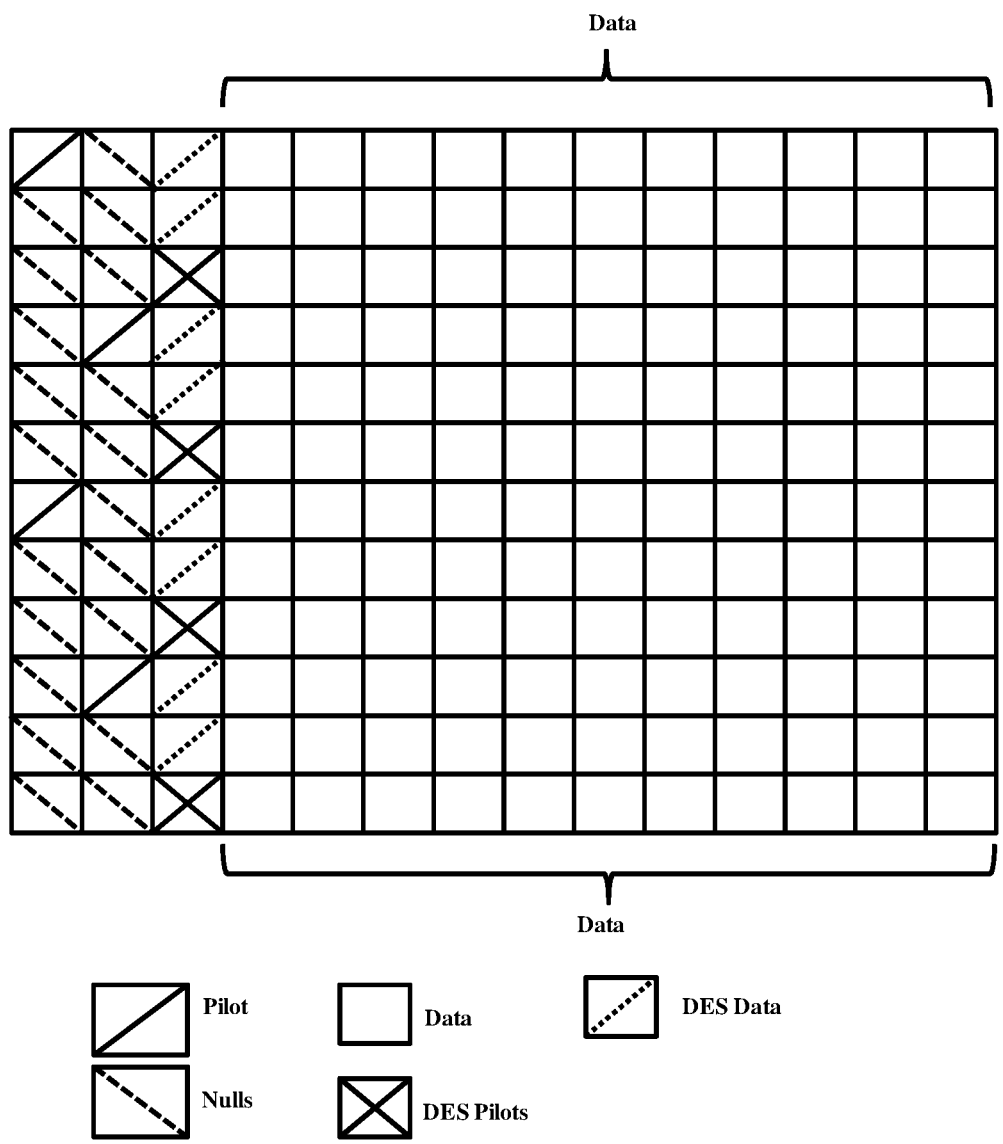
FIG. 9c illustrates an example structure of DES pilots and data for the third RRH/third base station, according to the embodiments as disclosed herein.

FIG. 9c illustrates an example structure of DES pilots and data for the third RRH/third base station, according to the embodiments as disclosed herein.

In contrary to the existing equalization techniques, the proposed method uses precoded DES pilots for data retrieval. The data retrieval can be performed is as described herein.

Consider H=LQ. Further, consider that 'P' denotes the vector composed of pilot values. We precode the pilots using Q* (where * denotes conjugate transpose) to obtain Q*P. Transmitting Q*P, the received signal can be represented as $$Y_P = HQ^*P = LP$$

If the entries of P are selected as orthogonal sequences, the receiver would be able to estimate the diagonal entries of L. For example, selecting L with a 1 in say i-th position and zeros in the remaining positions provides an estimate of diagonal element of $i^{th}$ user.

The method to generate precoded DES pilots for three RRHs 104a, 104b and 104c/BSs and three UEs 106a, 106b and 106c case is discussed further. The third OFDM symbol in a resource block is assigned for equalization. The DES pilots and data structure of the 3 BSs is shown in the FIGS. 9a, 9b and 9c.

The DES pilots and the data are considered with a value of 1 and 0 respectively. Further, the DES pilots are precoded by multiplying with Q* and are transmitted by the transmitter 600. In the receiver 700, the OFDM symbols corresponding to the desirable DES pilot positions as shown in FIGS. 9a, 9b and 9c respectively for the UE 106a, UE 106b and UE 106c are extracted. It should be noted that, each DES symbols extracted is constant for three consecutive subcarriers. The received data for each UE is divided by the extracted DES component for data retrieval.

The DES pilot transmission may be further generalized for larger cloud configurations (comprising of m-RRHs/BSs) to enable estimation of diagonal elements of the UE for every subcarrier or a group of subcarriers.

The C-RAN 102 employing linear precoders (W), the pilots are precoded by the same precoder used for data transmission.

Similar to the DCRS, a group of UEs transmit USRS to facilitate downlink channel estimation and THP precoding using uplink pilots.

The method for selecting transmit power scaling for DES pilots is as described herein. The PAPR of the DES pilots can be different from that of DCRS due to precoding matrix Q*. If the PAPR of DES pilots is higher than the DCRS, a fixed back-off value may be applied to the signal transmitted during the OFDM symbols occupied by the DES pilots. In an embodiment, the back-off value made known to the UEs so that UE can estimate the amplitude values of diagonal elements correctly.

Figure 10:
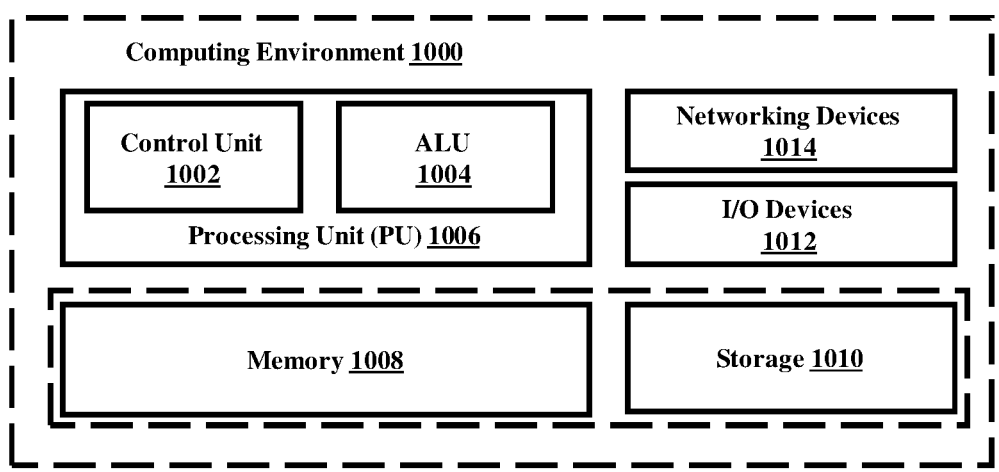
FIG. 10 illustrates a computing environment implementing a method for a cluster specific cloud radio transmission and reception, according to the embodiments as disclosed herein.

FIG. 10 illustrates a computing environment implementing a method for a cluster specific cloud radio transmission and reception, according to the embodiments as disclosed herein. As depicted in the FIG. 10, the computing environment 1000 comprises at least one processing unit 1006 that is equipped with a control unit 1002 and an Arithmetic Logic Unit (ALU) 1004, a memory 1008, a storage unit 1010, plurality of networking devices 1014 and a plurality of Input output (I/O) devices 1012. The processing unit 1006 is responsible for processing the instructions of the algorithm. The processing unit 1006 receives commands from the control unit 1002 in order to perform its processing. Further, any logical and arithmetic operations involved in the execution of the instructions are computed with the help of the ALU 1004.

The overall computing environment 700 can be composed of multiple homogeneous and/or heterogeneous cores, multiple CPUs of different kinds, special media and other accelerators. The processing unit 1006 is responsible for processing the instructions of the algorithm. Further, the plurality of processing units 1006 may be located on a single chip or over multiple chips.

The algorithm comprising of instructions and codes required for the implementation are stored in either the memory unit 1008 or the storage 1010 or both. At the time of execution, the instructions may be fetched from the corresponding memory 1008 or storage 1010, and executed by the processing unit 1006.

In case of any hardware implementations various networking devices 1014 or external I/O devices 1012 may be connected to the computing environment to support the implementation through the networking unit and the I/O device unit.

The embodiments disclosed herein can be implemented through at least one software program running on at least one hardware device and performing network management functions to control the elements.

The elements shown in FIGS. 1 through 10 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed:

1. A method implemented in a cloud radio access network (C-RAN), the method comprising:
    transmitting a channel state information (CSI) reference signals to a plurality of user equipment (UEs);
    receiving a measured downlink (DL) CSI, associated with the CSI reference signals, from each UE among the plurality of UEs, wherein the DL CSI corresponds to a plurality of antenna ports associated with a set of remote radio heads (RRHs);
    estimating an uplink (UL) CSI for each UE antenna port, wherein the UL CSI, associated with a measured DL CSI, using a pre-defined pilot structure received from each UE, wherein the pre-defined pilot structure is a reference signal;
    deriving a calibration coefficient for each RRH and UE antenna port pair based on the estimated UL CSI and the associated measured DL CSI;
    calibrating the estimated UL CSI based on the derived calibration coefficient to obtain a subsequent calibrated DL CSI;
    obtaining a linear or a non-linear precoder using the subsequent calibrated DL CSI;
    precoding a data using the linear or non-linear precoder to obtain a precoded data; and
    transmitting the precoded data to each UE through the RRHs.

2. The method of claim 1, wherein the method further comprises transmitting the precoded data along with one of diagonal element signaling (DES) pilots, linear precoded pilots and non-linear precoded pilots through the RRHs.

3. The method of claim 1, wherein the pre-defined pilot structure is determined using at least one of predetermined positions in time domain and predetermined positions in frequency domain, said predetermined positions in time domain corresponds to orthogonal frequency digital multiplexing (OFDM) symbols and the predetermined positions in frequency domain corresponds to subcarriers.

4. A method implemented in a user equipment (UE), the method comprising:
    transmitting a measured downlink (DL) CSI to a cloud radio access network (C-RAN), wherein the DL CSI corresponds to a plurality of antenna ports associated with a set of remote radio heads (RRHs);
    transmitting an uplink (UL) sounding signal associated with the measured DL CSI along with a pre-defined pilot structure to the cloud RAN (C-RAN), wherein the pre-defined pilot structure is a reference signal;
    receiving a signal from a RRH along with one of diagonal element signaling (DES) pilots, linear precoded pilots and non-linear precoded pilots, wherein the received signal includes data intended to the UE;

estimating the diagonal elements associated with the data signal using one of the DES pilots, the linear precoded pilots and the non-linear precoded pilots in the received signal; and retrieving the data from the data signal based on the estimated diagonal elements.

5. A cloud radio access network (C-RAN) comprising:
a reference signals transmission unit configured to:
   transmit a channel state information (CSI) reference signals to a plurality of user equipment (UEs);
a downlink CSI reception unit configured to:
   receive a measured downlink (DL) CSI associated with the CSI reference signals, from each UE among the plurality of UEs, wherein the DL CSI corresponds to a plurality of antenna ports associated with a set of remote radio heads (RRHs);
an uplink CSI estimation unit configured to:
   estimate an uplink (UL) CSI for each UE antenna port, wherein the UL CSI, associated with measured DL CSI, is estimated using a pre-defined pilot structure received from each UE, wherein the pre-defined pilot structure is a reference signal; and
a calibration coefficient derivation unit configured to:
   derive a calibration coefficient for each RRH and UE antenna port pair based on the estimated UL CSI and the associated measured DL CSI and the estimated UL CSI;
   calibrate the estimated UL CSI DL CSI based on the derived calibration coefficient to obtain subsequent calibrated DL CSI; and
   obtain a linear or a non-linear precoder using the subsequent calibrated DL CSI;
   precode a data using the linear or non-linear precoder to obtain a precoded data; and
a transmitter unit configured to transmit data the precoded data to each UE through the RRH.

6. The C-RAN of claim 5, wherein the transmitter unit is further configured to transmit the precoded data along with one of diagonal element signaling (DES), linear precoded pilots and non-linear precoded pilots through the RRHs.

7. A user equipment (UE) comprising:
a downlink CSI transmission unit configured to:
   transmit a measured downlink (DL) CSI to a cloud radio access network (C-RAN), wherein the DL CSI corresponds to a plurality of antenna ports associated with a set of remote radio heads (RRHs) a signal reception unit configured to:
   transmit an uplink (UL) sounding signal associated with the measured DL CSI along with a pre-defined pilot structure to the cloud RAN;
   receive a signal from a RRH along with diagonal element signaling (DES) pilots, linear precoded pilots and non-linear precoded pilots, wherein the received signal includes data intended to the UE;
a pilots estimation unit configured to:
   estimate the diagonal elements associated with the data signal using one of the DES pilots, linear precoded pilots and non-linear precoded pilots in the received signal; and
a data retrieval unit configured to:
   retrieve data from the data signal based on the estimated diagonal elements.

8. The UE of claim 7, wherein the downlink CSI transmission unit configured to transmit data using a precoder, wherein the precoder is one of a linear precoder and a non-linear precoder.

* * * * *